(12) United States Patent
Amundsen et al.

(10) Patent No.: US 9,803,463 B2
(45) Date of Patent: Oct. 31, 2017

(54) ARRANGEMENT AND METHOD FOR MONITORING OF ANNULUS VOLUME

(71) Applicant: 4SUBSEA AS, Rådal (NO)

(72) Inventors: Torbjørn Amundsen, Bergen (NO); Carl Olav Wickmann, Nesttun (NO); Henrik Tvedt, Bergen (NO)

(73) Assignee: SUBSEA AS, Hvalstad (NO)

( * ) Notice: Subject to any disclaimer, the term of this patent is extended or adjusted under 35 U.S.C. 154(b) by 0 days.

(21) Appl. No.: 15/399,770

(22) Filed: Jan. 6, 2017

(65) Prior Publication Data

US 2017/0145808 A1  May 25, 2017

Related U.S. Application Data

(63) Continuation of application No. PCT/NO2015/050127, filed on Jul. 8, 2015.

(30) Foreign Application Priority Data

Jul. 8, 2014 (NO) .................................. 20140864

(51) Int. Cl.
| | |
|---|---|
| *E21B 17/01* | (2006.01) |
| *E21B 47/003* | (2012.01) |
| *E21B 47/00* | (2012.01) |
| *E21B 41/00* | (2006.01) |
| *G01M 3/28* | (2006.01) |
| *E21B 34/00* | (2006.01) |

(52) U.S. Cl.
CPC .......... *E21B 47/0003* (2013.01); *E21B 17/01* (2013.01); *E21B 34/00* (2013.01); *E21B 41/00* (2013.01); *G01M 3/283* (2013.01); *G01M 3/2815* (2013.01)

(58) Field of Classification Search
CPC ........ E21B 17/01; E21B 17/015; E21B 34/00; E21B 47/0003; G01M 3/2815
See application file for complete search history.

(56) References Cited

U.S. PATENT DOCUMENTS

| 5,072,622 A | 12/1991 | Roach et al. |
| 6,171,025 B1 | 1/2001 | Langer et al. |
| (Continued) | | |

FOREIGN PATENT DOCUMENTS

| EP | 0460511 A1 | 12/1991 | |
| GB | WO 2010036792 A2 * | 4/2010 | ........... E21B 17/015 |
| (Continued) | | | |

OTHER PUBLICATIONS

International Search Report, application No. PCT/NO2015/050127.
Written Opinion of the ISA, application No. PCT/NO2015/050127.

*Primary Examiner* — Matthew R Buck
(74) *Attorney, Agent, or Firm* — Richard A. Fagin

(57) ABSTRACT

The present description is related to integrity monitoring of an annulus volume in a pipe. More specifically, the present disclosure is related to an arrangement and a method for determination of annulus free volume of a pipe. The monitoring can as an example be performed by use of a logical unit which controls the annulus testing by use of diffusion or gas feed, and also give input to calculation of the pipe's remaining lifetime. Further, the arrangement can as an example save and present results, allow for user specified settings and set off alarms it critical values are detected.

27 Claims, 5 Drawing Sheets

(56) References Cited

U.S. PATENT DOCUMENTS

| | | | | |
|---|---|---|---|---|
| 6,634,388 B1 * | 10/2003 | Taylor | .................... | B29C 63/34 |
| | | | | 138/104 |
| 8,256,469 B2 * | 9/2012 | Felix-Henry | ......... | F16L 11/083 |
| | | | | 138/104 |
| 8,342,248 B2 * | 1/2013 | Hall | ........................ | E21B 17/01 |
| | | | | 166/344 |
| 8,783,358 B2 * | 7/2014 | Critsinelis | ............... | E21B 17/01 |
| | | | | 166/344 |
| 8,857,521 B2 * | 10/2014 | Clements | ................ | F16L 33/01 |
| | | | | 166/344 |
| 2005/0005708 A1 | 1/2005 | Dickes | | |

FOREIGN PATENT DOCUMENTS

| | | | |
|---|---|---|---|
| GB | WO 2010118342 A1 * | 10/2010 | ............ G01M 3/002 |
| WO | 03083251 A1 | 10/2003 | |
| WO | 2009094631 A1 | 7/2009 | |
| WO | 2010036792 A2 | 4/2010 | |
| WO | 2010118342 A1 | 10/2010 | |
| WO | 2013172730 A1 | 11/2013 | |
| WO | 2014000760 A1 | 1/2014 | |

* cited by examiner

ARRANGEMENT AND METHOD FOR MONITORING OF ANNULUS VOLUME

CROSS-REFERENCE TO RELATED APPLICATIONS

This is a continuation of International Application No. PCT/NO2015/050127 filed on Jul. 8, 2015. Priority is claimed from Norwegian Patent Application No. 20140864 filed on Jul. 8, 2014.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

The present disclosure is related to an arrangement and a method for annulus volume integrity monitoring. More specifically the present disclosure relates to an arrangement and method for determination of annulus free volume of a flexible riser. The monitoring can be performed by use of a logical unit which runs the annulus testing with diffusion or gas feed.

Monitoring and integrity evaluation are performed to control and map the condition and quality of the annulus volume in as an example a pipe, typically a flexible riser. Annulus testing for calculation of annulus free volume is a significant part of the pipe integrity evaluation. As shown in FIG. 1, the annulus volume 102 in a flexible pipe is defined as the area between the outer sheath 101 and the pressure barrier 103.

Based on such an annulus test, the fluid content in annulus can be evaluated by comparing the measured annulus free volume and knowledge of the total annulus volume. The annulus volume in a flexible pipe is expected to remain dry or experience a slow filling during time due to among other factors diffusion through the pipe pressure barrier. Annulus testing of flexible risers is per today typically performed annually at offshore installations in the Norwegian continental shelf. FIG. 2 shows an example sketch of an offshore installation which comprises a flexible pipe 201, a platform 202 and a test location 203. The annulus testing of the flexible pipe 201 is typically performed at test location 203.

Results from manual annulus tests are typically input for calculation of the pipe's remaining lifetime. As an example the annulus volume can be fluid filled due to damaged outer sheath. The deterioration and therefore the remaining pipe lifetime with fluid filled annulus, is typically calculated based on the time of execution of the latest annulus test. If latest test was performed one year ago, one year of the remaining lifetime must be subtracted, by assuming that the damage appeared shortly after the previous test. Large expenses are therefore likely to occur by not being able to operate the pipe up to one more year or due to short time for planning when a flexible pipe needs to be replaced. The long time intervals between each annulus test is therefore a problem today. Especially some pipes require tight follow-up.

At present, annulus testing is performed manually, which requires key personal offshore to perform the testing. Thus the testing is dependent on human variations and factors, which can result in tests not being performed or not to be performed when scheduled. Additionally, human factors can cause separate parameter basis for separate tests. It can also be mentioned that for some pipes ventilating of annulus is performed directly in to the open, which cause danger for corrosion due to oxygen access.

SUMMARY

According to the present disclosure, the above mentioned problems may be solved by an arrangement and method for determination of a pipe's annulus free volume and monitoring of the annulus volume state.

The mentioned monitoring can comprise initiation of pressure build up by adjusting the operational pressure to a predefined high pressure limit, keep the pressure for a given time period for the pressure to be stabilized, decide whether this high pressure is stabilized and perform at least one measurement of the pressure. If the pressure is found to be within a given accuracy compared to the predefined high pressure limit, the operation pressure can be adjusted to a predefined low pressure limit. Depressurization is obtained by emptying the reference volume at least one time. Keep the pressure for a given period of time for the pressure to stabilize, decide whether the pressure is stabilized at the low pressure limit and perform at least on measurement of the pressure. If the pressure is found to be within a given accuracy compared to the predefined low pressure limit, the accumulated volume can be calculated based on data from the emptying of the at least one reference volume.

A first aspect of the present disclosure is an arrangement for determination of a pipe's annulus free volume, where the arrangement includes a reference volume, a valve connected to the annulus free volume and to the reference volume for depressurizing of the annulus volume to the reference volume, at least one valve connected to the reference volume and at least one outlet for depressurizing of the reference volume, and at least on pressure instrument for measurement of the annulus volume pressure, where the mentioned valves and the at least one pressure instrument is arranged to be read off and controlled for pressurizing and depressurizing, and where measurements of reference volume pressure and annulus volume pressure prior to and after depressurizing and the reference volume dimensions are used for calculation of the annulus free volume.

Calculation of the annulus free volume is performed by use of equations described below.

The arrangement can further comprise at least one logical unit for read off and control of the mentioned valves and the at least one pressure instrument during pressurizing and depressurizing. The logical unit is further arranged to use the pressure measurements in the reference volume and the annulus volume prior to and after depressurization and the reference volume dimension/size for calculation of the annulus free volume.

The arrangement can further comprise at least one gas container for pressurizing, one pressure regulator connected to the gas container to regulate the gas feed, and at least one valve to open and close for pressurization of the at least one annulus volume.

Further, the arrangement can comprise a pressure instrument connected to the gas container to gas container pressure measurement, and at least one pressure instrument connected to the pressure regulator for indication of the regulator settings. The mentioned pressure instruments are further connected to the logical unit for controlling and read off.

Additionally, the arrangement can comprise at least one pressure instrument for measurement of the reference volume pressure. The arrangement can comprise at least one pressure relief valve to control the deflation from the gas container, and eventually at least one pressure relief valve to control the deflation from the at least one annulus volume directly through the outlet. The gas feed is given from the mentioned external gas container or an internal gas container.

Another aspect of the present disclosure is a method for determination of a annulus free volume in a pipe, where a pressure difference is established between the annulus volume and the reference volume, a number of depressurizations from the annulus volume to the reference volume, where the number is one or more, pressure is measured prior to and after the number of depressurizations. The annulus free volume is then calculated based on pressure measurements in the annulus volume prior to and after the number of depressurizations, together with pressure measurements for each depressurization in the reference volume and the reference volume dimension/size.

The method can comprise steps for establishment of a predefined reference volume pressure prior to each depressurization, and reference volume pressure measurement after each depressurization.

Further, the pressure difference establishment can be performed by diffused gas or by applying gas from a gas container to the annulus volume.

The method can comprise steps to decide whether measured pressure in the annulus volume has reached the high pressure limit, followed by keeping this established pressure for a given period of time if necessary, and decide whether measured pressure in the annulus volume after the same period of time is within a given accuracy of the high pressure limit, further establishment of a pressure difference if this is not the case, and thereafter followed by the steps after the depressurizing as described above.

Further, the method can comprise decision of whether the measured pressure have reached the low pressure limit after depressurizing, followed by keeping this pressure for a given period of time if this is the case, decision of whether measured pressure in the annulus volume after this period of time is within a given accuracy to the low pressure limit, followed by further depressurizing if this is not the case, and thereafter followed by steps for calculation of annulus free volume.

Calculation of the annulus free volume can be performed by use of the following equations:

$$V = \frac{V_{out}}{(P_{a1} - P_{a2})}$$

$$V_{at} = \sum_{i=1}^{i=n} V_{ref}(P_{ref1i} - P_{ref2i})$$

Where:
V is annulus free volume,
$V_{out}$ is accumulated volume during depressurization,
$V_{ref}$ is reference volume,
$P_{a1}$ is annulus pressure prior to the number of depressurizations (i=1)

$P_{a2}$ is annulus pressure after the number of depressurizations (i=n)
$P_{ref1}$ is pressure in the reference volume prior to depressurization number i to the outlet,
$P_{ref2}$ is pressure in the reference volume after depressurization number i to the outlet, and
n is the number of depressurization cycles.

The accumulated volume calculation can be performed by at least one logical unit based on data received when emptying at least one reference volume by use of a valve at least one time until a low pressure limit in the annulus volume is reached.

The pressure difference establishment can comprise pressurization performed by closing a valve if diffusion is used, or by adjustment of pressure regulator, and opening of the valve to the gas container and closing of the valve to the reference volume if the pressurization is performed by use of gas feed.

The method can comprise decision of whether the pressure is stabilized at the high pressure limit, by pressure measurement for diffused gas, or by closing of valve and pressure measurement if gas feed is used.

Emptying the reference volume can be performed at least one time by closing the valve in-between the annulus volume and the reference volume, and by opening the valve in-between the reference volume and the belonging outlet, until the low pressure limit in the annulus volume is reached.

Decision of whether or not the pressure is stabilized, can be performed by pressure measurement by use of a pressure instrument arranged at the annulus volume or at the reference volume.

The method can comprise volume calculations which allows for correction for diffusion and temperature differences, and control of one or more components of an arrangement as described above. The logical unit can perform such calculations and corrections.

The method can comprise the following features performed by the logical unit: control of at least one valve for pressurizing and depressurizing of at least one annulus volume, read off of at least one pressure instrument for pressure measurement of at least one reference volume, control of at least one valve for pressurizing and depressurizing of at least one reference volume, and read off of at least one pressure instrument for pressure measurement of at least one annulus volume.

Further, the following features of the method can be performed by a logical unit: read off of at least one pressure instrument for pressure measurement of at least one gas container, control of at least one pressure regulator for pressure adjustment of the gas feed from the gas container, read off of at least one pressure instrument to control the adjustments of the pressure regulator, and control of at least one valve for depressurizing of at least one gas container.

A third aspect of the present disclosure is a method for monitoring of the annulus volume integrity comprising a method for calculation of annulus free volume as described above, where the method comprises one or more of the following steps: comparing the new annulus free volume to one or more previous calculated annulus free volumes, comparing accumulated volume per time to a normal condition, comparing accumulated volume per time to an historical trend, use of annulus free volume for calculation of pipe's remaining lifetime, saving and presenting measured and calculated values, and triggering one or more alarms if critical values are found. The method can be performed continuously or at regular intervals.

All figures are schematic and not in scale, and they are showing only the parts necessary to illustrate the arrangement and method, other parts are omitted or merely indicated.

DETAILED DESCRIPTION

The solution according to the present disclosure may be obtained by a method and an arrangement in accordance to the characterizing parts of the independent claims.

The present disclosure is related to an arrangement and a method for monitoring of the annulus volume integrity. More specifically, the present disclosure relates to an arrangement and a method for determination of an annulus free volume in a pipe. As an example the monitoring can be performed by use of an logical unit which controls the annulus testing by diffusion or gas feed, and, based on the test results, calculates the annulus free volume. The test results can as an example be input to calculation of the pipe remaining lifetime.

The annulus testing can in a first embodiment comprise use of diffused gas and in a second embodiment comprise use of gas feed. By use of diffused gas, the mentioned monitoring is performed by waiting for a natural pressurization of the annulus volume. This is well suited for high diffusion pipes. However, for flexible pipes with low or no diffusion, gas feed is typically used. The advantage of gas feed, as an example nitrogen, is that the annulus testing will typically be less time consuming. The advantage of use of diffused gas is that the arrangement or product consist of fewer components and is thus less exposed to errors and more automotive.

Figure 1:
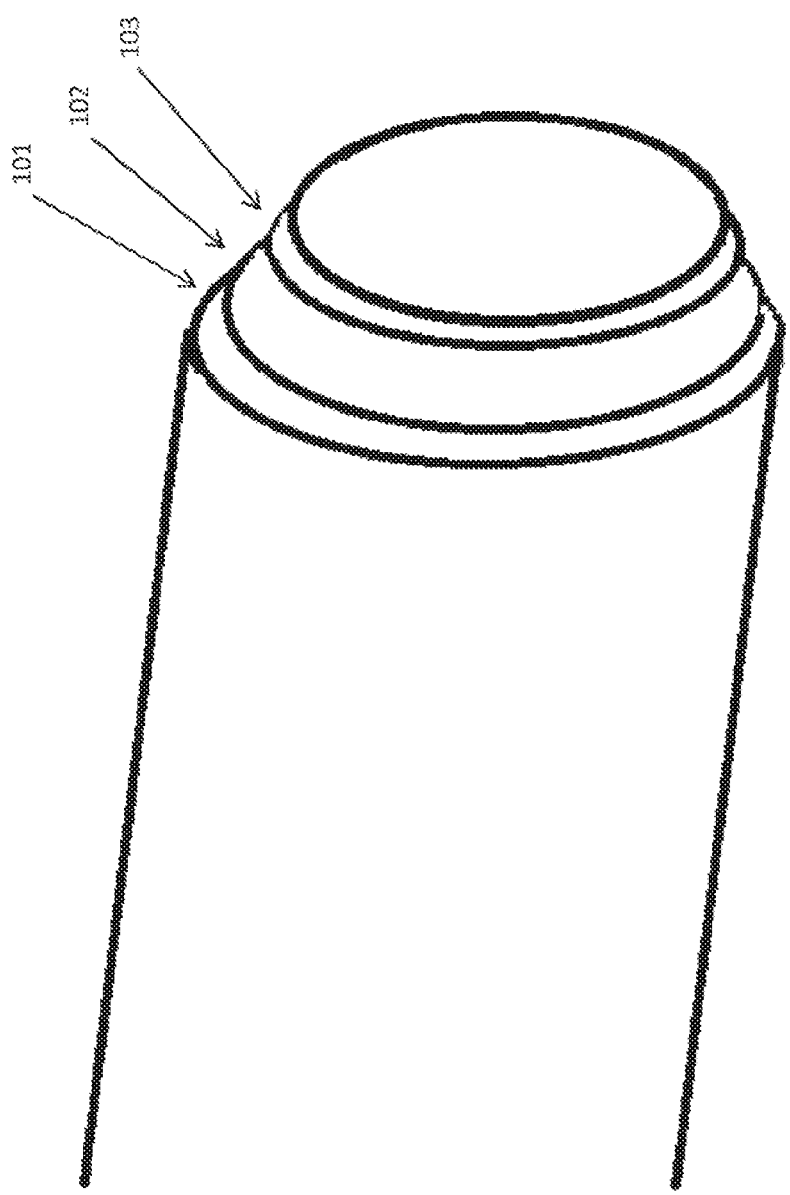
FIG. 1 shows the cross section of a flexible pipe.
Figure 2:
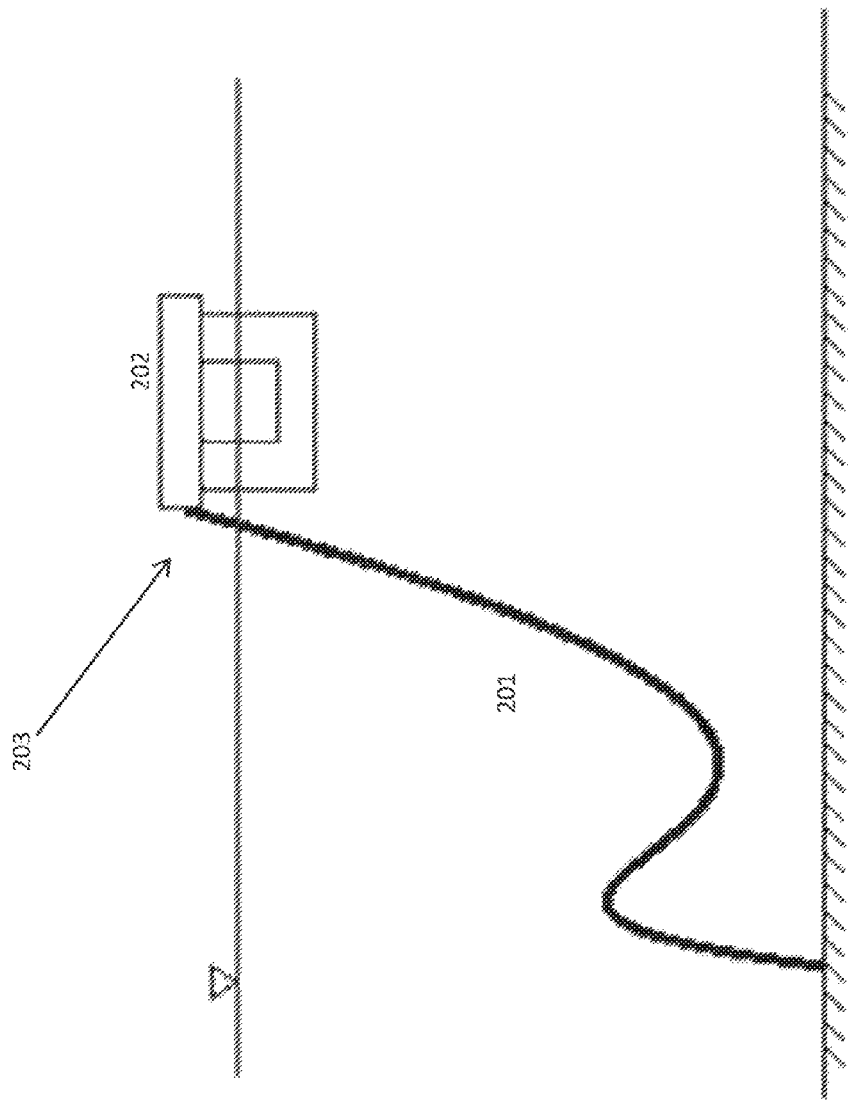
FIG. 2 shows an example of an offshore installation which comprises a flexible pipe.
Figure 3:
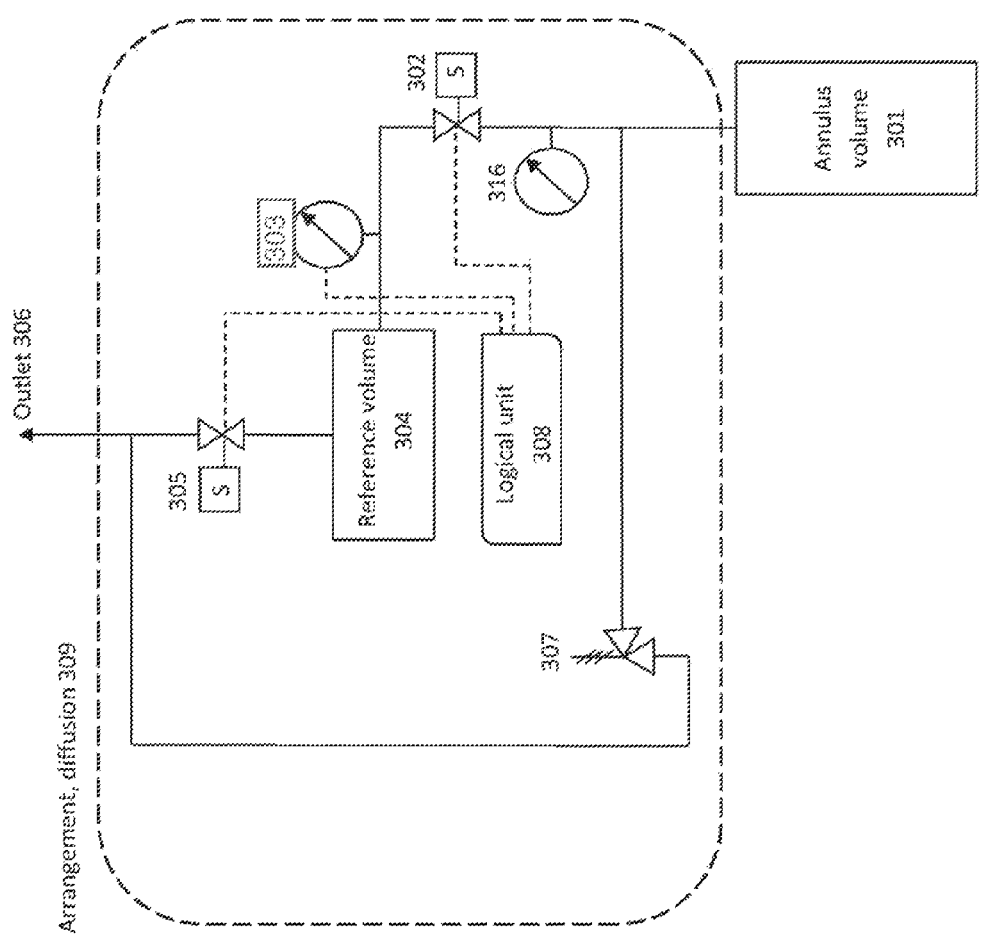
FIG. 3 shows an arrangement for monitoring of the integrity of at least one annulus volume based on diffused gas.

In a first embodiment, i.e. the test setup for annulus testing by use of diffused gas, the arrangement typically comprises, not limited by, the components inside box 309 in FIG. 3; at least one valve 302, as an example an solenoid valve, connected to at least one annulus volume 301, at least one pressure instrument 303 for pressure measurement of at least one reference volume container 304, also called reference volume, the at least one reference volume 304 connected to a pressure instrument 303 and valve 302, at least one valve 305 connected to the at least one reference volume 304 and at least one outlet 306, at least one pressure relief valve 307 which for safety issues is directly connected from at the least one annulus volume 301 to the at least one outlet 306, at least one pressure instrument 316 for pressure measurement of the annulus volume 301, and at least one logical unit 308 connected to, controlling and reading off pressure instrument 316, valve 302, pressure instrument 303 and valve 305. The arrangement 309 can, based on the above, monitor one or more annulus volumes 301 and FIG. 3 thus shows a monitoring system.

In the illustrated embodiment a pressure instrument 303, 316 is arranged at both the annulus volume 301 and at the reference volume 304. In another embodiment one single pressure instrument 303 or 316 can be used for measuring of the annulus volume or the reference volume.

Figure 4:
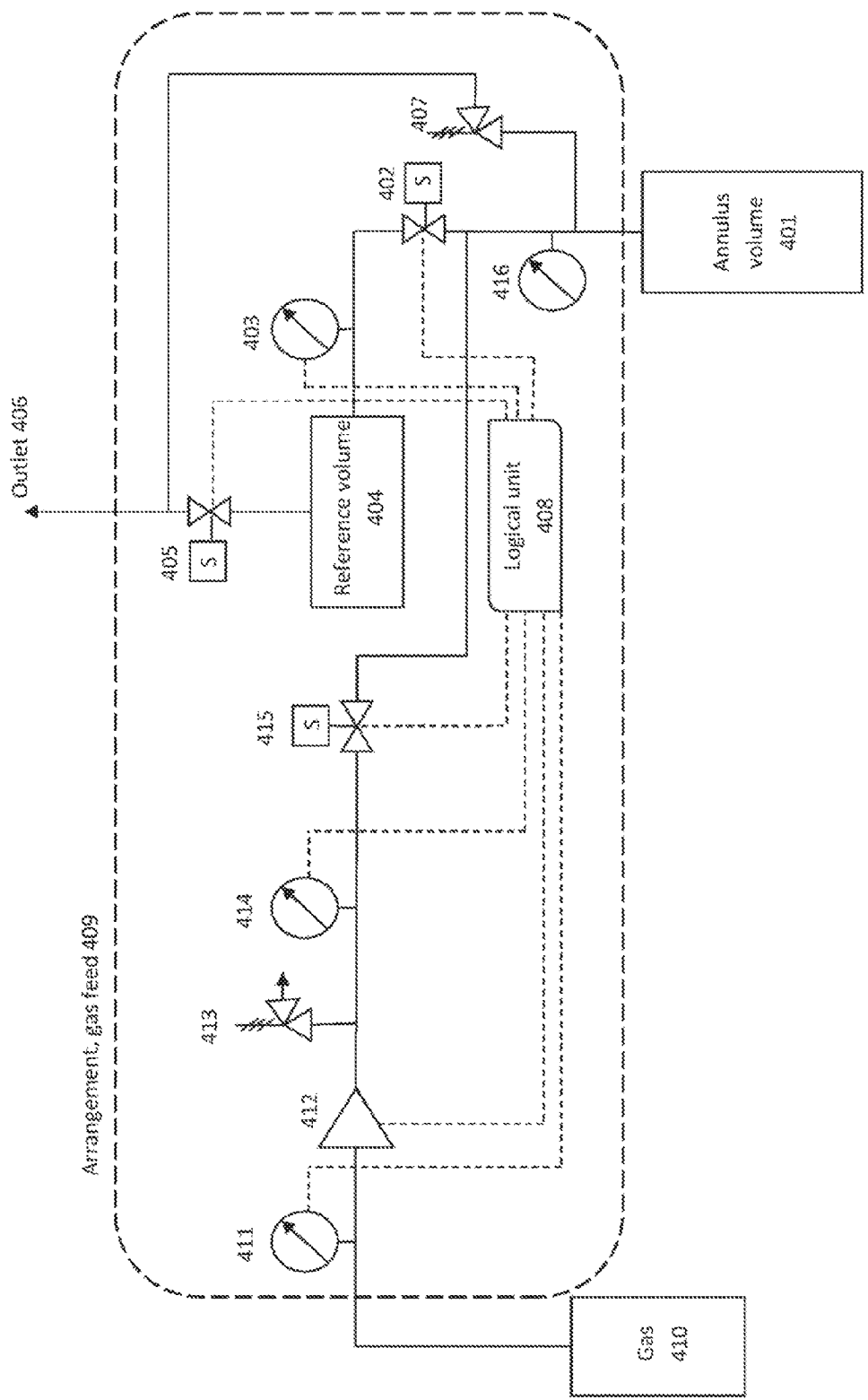
FIG. 4 shows an arrangement for monitoring of the integrity of at least one annulus volume based on gas feed.

In a second embodiment, test setup for annulus testing by use of gas feed, the arrangement typically comprises, not limited by, the components inside box 409 in FIG. 4. In addition to the components described in the first embodiment, this arrangement can comprise at least one gas container 410, where gas container 410 can be located internally or externally the arrangement 409, i.e. the product. FIG. 4 show a gas container 410 as an external gas container. More specifically, the mentioned arrangement comprises at least one pressure instrument 411 connected to at least one gas container 410, used to measure the remaining gas in the gas container 410, at least one pressure regulator 412, two-stages or more accurate regulator, connected to at least one gas container 410, at least one pressure release valve 413 connected to pressure regulator 412, at least one pressure instrument 414, for read off of the pressure regulator 412 settings, at least one valve 415 connected to a pressure regulator 412 and thus the gas container 410, used for pressurizing, at least one pressure instrument 416 for pressure measurement of the annulus volume 401, at least one valve 402 connected to at least one annulus volume 401, at least one pressure instrument 403 for pressure measurements of the reference volume 404, at least one valve 405 connected to at least one reference volume 404 and at least one outlet 406, at least one pressure relief valve 407 directly connected from the annulus volume 401 to at least one outlet 406 for safety, and finally, at least one logical unit 408 connected to, controlling and reading off valve 402, pressure instrument 403, valve 405, pressure instrument 416, pressure instrument 411, pressure regulator 412, pressure instrument 414 and valve 415. Additionally, valve 415 is connected to the annulus volume 401. The arrangement 409 can be used for monitoring of one or more annulus volumes 401 and thus FIG. 4 shows a monitoring system.

For both the above mentioned embodiments the logical unit 308, 408 contains software for controlling of, as an example, pressure instruments and valves. The arrangement 309, 409 is therefore able to measure annulus volume 301, 401 pressure, control valves for pressurizing and depressurizing, and also perform calculations. Further, the monitoring system is able to save and present results, use user specified settings, give one or more alarms if values outside the normal range is seen and issue the results to external systems.

The pressure instruments 305, 405, 316, 416 can measure pressure both in the annulus volume 301, 401 and in the reference volume 304, 404, when valve 302, 402 in-between the mentioned volumes is open.

The pressure difference between the annulus volume 301, 401 and the reference volume 304, 404 can as an example be obtained by an annulus pressure above atmospheric pressure and then typically with atmospheric pressure in the reference volume and the outlet 306, 406, or by vacuum at the outlet and thus in the reference volume 304, 404.

Typically, a relatively small reference volume 304, 404 will be used, it could be one or more magnitudes smaller than the annulus volume 301, 401, and emptied several times. However, the arrangement and method according to the present disclosure are also applicable for a relatively large reference volume 304, 404, which can be same size or even larger than the annulus volume 301, 401, and emptied few times.

In another embodiment of the present disclosure the arrangement 309, 409 can, in-between the annulus testing, be used for diffusion flow rate measurement of the annulus volume 301, 401. The diffusion flow rate can also be utilized for calibration of the calculated annulus volume.

In an even further embodiment according to the present disclosure, the arrangement 309, 409 can be a part of a larger monitoring system, used for continuous or regular integrity monitoring of the annulus volume, and in an even further embodiment the mentioned monitoring system can be part of a control system for control of one or more flows and gas or fluid pressures in annulus volumes in, as an example, pipes.

In an embodiment according to the present disclosure the arrangement 309, 409 is controlled by use of a logical unit 308, 408. However, it is possible in some embodiments to control the arrangement components manually.

Figure 5:
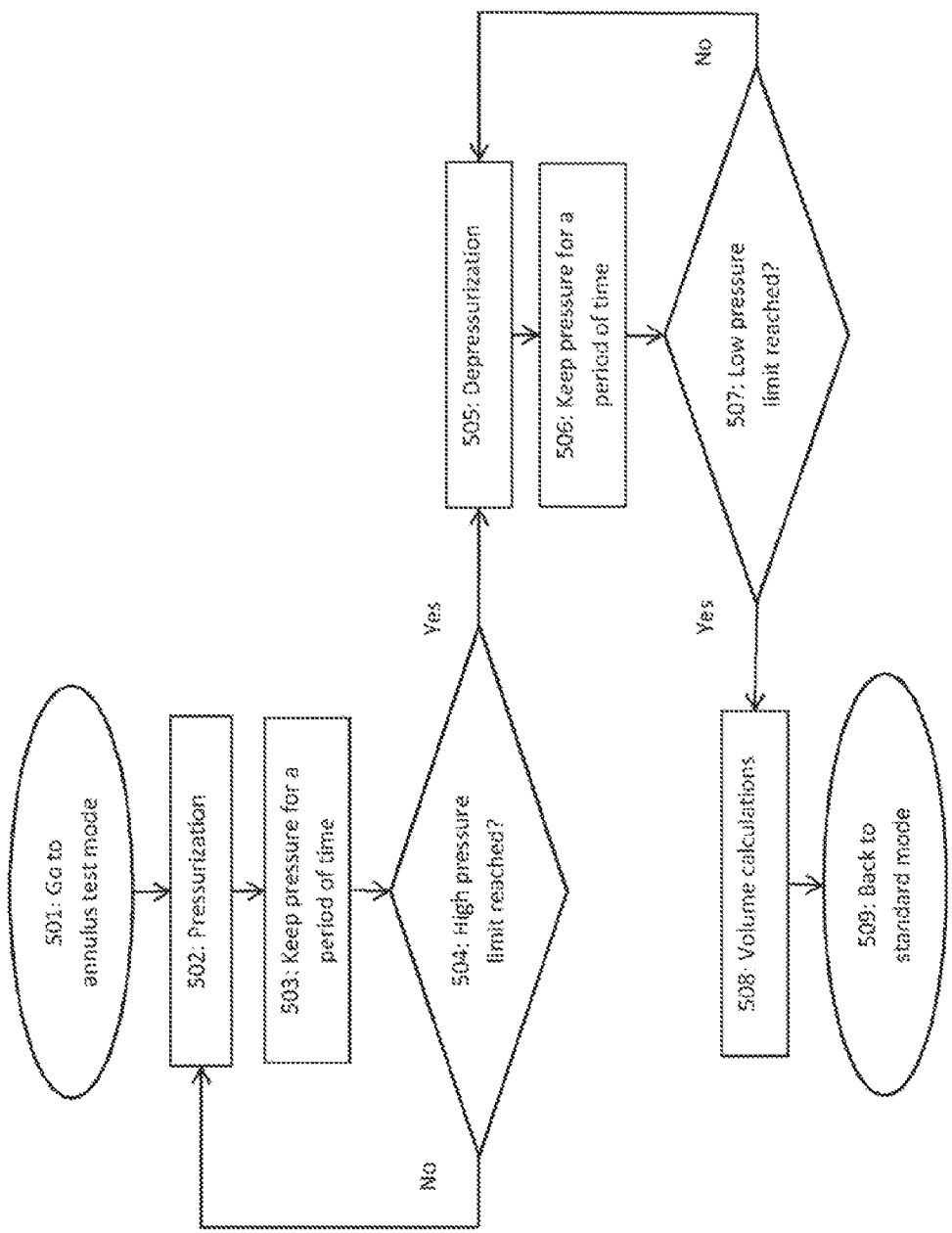
FIG. 5 shows an example flow chart for the method of integrity monitoring of at least one annulus volume.

At least one annulus test is performed when monitoring the annulus volume integrity. As an example, the annulus testing can comprise steps like shown in FIG. 5. In the first step, the arrangement is set to perform an annulus test, i.e. the arrangement is set to annulus testing mode 501. In the next step the arrangement is initiating a pressurization 502. If necessary the pressure is kept for a given period of time until it is stabilized 503. Thereafter, the arrangement is performing a pressure measurement to check whether the high pressure limit is reached. If not, a new pressurization is performed 502. If the high pressure limit is reached, the process continues to step 504. Thereafter a depressurization is performed 505. If necessary, the pressure is kept for period of time until it is stabilized 506. The arrangement is thereafter performing a new pressure measurement to check whether the low pressure limit is reached. If not, a new depressurization is performed 505. If the low pressure limit is reached, the process continues to step 507. Thereafter annulus volume calculations are performed 508. The annulus testing is in this example ended by setting the arrangement back to standard mode 509.

With reference to the annulus test example above, it is emphasized that in other embodiments a standard mode is not needed. The purpose of the steps related to keeping the pressure at a high and low pressure limit is to increase the accuracy and is not needed in other embodiments.

An example embodiment of the method for monitoring of the annulus integrity is described more in detail in the following. The steps comprise pressurization both by use of diffusion and gas feed.

The method steps can as an example be:
1) Initiate pressurization for pressure build up to a predefined high pressure limit, by use of diffusion or gas feed. Often a minimum pressurization period is used.
   Diffusion: valve 302 open and valve 305 closed
   Gas feed: valve 402 and valve 415 open and valve 405 closed, the pressure regulator 412 is set to the high pressure limit
2) When the annulus pressure reaches the high pressure limit, keep this pressure for a given period of time.
   Diffusion: time period zero
   Gas feed: valve 415 closed, arrangement need to keep the pressure for a given period of time for the pressure to stabilize
3) Pressure measurement after stabilizing. If the measured pressure is within a given accuracy to the high pressure limit, as an example 90 to 110% of the high pressure limit, continue to next step. If not, perform a new pressurization (i.e. start at step 1)).
   Diffusion: pressure instrument 303 is used for pressure measurement
   Gas feed: valve 402 open, valve 405 and 415 closed, pressure instrument 403 is used for pressure measurement
4) Initiate depressurization to a predefined low pressure limit. Flow measurement cycles will then be run by the arrangement to meet the new operational settings. Accumulated volume is calculated by the arrangement by emptying the annulus volume through the reference volume multiple times to meet the low pressure limit.
   Diffusion: valve 302 open, valve 305 closed, thereafter emptying reference volume by closing valve 302 and opening valve 305. Repeat this step until the low pressure limit is reached
   Gas feed: valve 405 and 415 closed, valve 402 open, thereafter emptying reference volume by closing valve 402 and opening valve 405. Repeat this step until the low pressure limit is reached
5) When the pressure is within a given accuracy to the low pressure limit, as an example 90 to 110% of the low pressure limit, the arrangement will keep the pressure for a given period of time for the pressure to stabilize.
   Diffusion: time period zero
   Gas feed: arrangement need to keep the pressure a given period of time for the pressure to stabilize
6) Pressure measurement after stabilizing. If the pressure is measured to be within a given accuracy to the low pressure limit, continue to next step. If not, perform a new depressurization (i.e. start at step 4)).
   Diffusion: pressure instrument 303 is used for pressure measurement
   Gas feed: pressure instrument 403 is used for pressure measurement
7) When measurements are ended, the annulus free volume is calculated by the logical unit 308, 408.
8) Test ended.

According to some embodiments of the present disclosure the annulus free volume is calculated by use of the following equations.

Volume calculations are performed based on the (combined) ideal gas equation:

$$\frac{PV}{T} = C$$

Where P is absolute pressure, V is volume, T is absolute temperature (Kelvin) and C is a constant.

The calculation of annulus free volume can be based on the following equations:

$$V = \frac{V_{out}}{(P_{a1} - P_{a2})}$$

$$V_{at} = \sum_{i=1}^{i=n} V_{ref}(P_{ref1i} - P_{ref2i})$$

Where:
V is annulus free volume,
$V_{out}$ is accumulated volume during depressurization,
$V_{ref}$ is reference volume,
$P_{a1}$ is annulus pressure prior to the number of depressurizations (i=1)
$P_{a2}$ is annulus pressure after the number of depressurizations (i=n)

$P_{ref1}$ is pressure in the reference volume prior to depressurization number i to the outlet, $P_{ref2}$ is pressure in the reference volume after depressurization number i to the outlet, and n is the number of depressurization cycles.

The equations above are based on a case where the temperature is assumed to be constant and equal inside and outside the annulus volume 301, 401.

As previously mentioned, the accumulated volume can be calculated by emptying the reference volume 304, 404 repeatedly until a low pressure limit in the annulus volume 301, 401 is reached.

The reference volume pressure after emptying can as an example be equal to atmospheric pressure or be vacuum.

The annulus test results are typically used as input for calculation of the pipe's remaining lifetime. As an example, this could be a pipe where the annulus is fluid filled due to outer sheath damage.

It can further be mentioned that the present disclosure is a one way system, which ensures no oxygen into the annulus volume.

Even though the present disclosure is described with reference to a limited number of embodiments, a person of ordinary skill in the art, having the benefit of the present disclosure will understand that modifications are possible with no deviation from the scope of the present disclosure as it is defined in the following claims.

What is claimed is:

1. An arrangement for determination of an annulus free volume in a pipe, the arrangement comprising:
    a reference volume,
    at least one first valve connected to the annulus free volume in the pipe and the reference volume for depressurization of the annulus free volume in the pipe to the reference volume,
    at least one second valve connected to the reference volume and at least one outlet for depressurization of the reference volume, and
    at least one first pressure instrument for pressure measurement of the annulus free volume in the pipe and at least one second pressure instrument for pressure measurement in the reference volume, wherein
    the at least one first and second valve and the at least one first and second pressure instrument are arranged to read off and control pressurization and depressurization, and where the pressure measurement in the reference volume and in the annulus free volume in the pipe prior to and after depressurization, together with a dimension of the reference volume are used for calculation of the annulus free volume in the pipe.

2. Arrangement according to claim 1, where the calculation of the annulus free volume is performed by the following equations:

$$V = \frac{V_{out}}{(P_{a1} - P_{a2})}$$

$$V_{at} = \sum_{i=1}^{i=n} V_{ref}(P_{ref1i} - P_{ref2i})$$

where:
    V is annulus free volume,
    $V_{out}$ is accumulated volume during depressurization,
    $V_{ref}$ is reference volume, $P_{a1}$ is annulus pressure prior to the number of depressurizations (i=1)

$P_{a2}$ is annulus pressure after the number of depressurizations (i=n)

$P_{ref1}$ is pressure in the reference volume prior to depressurization number i to the outlet, $P_{ref2}$ is pressure in the reference volume after depressurization number i to the outlet, and n is the number of depressurization cycles.

3. Arrangement according to claim 1, where the arrangement further comprises:
    at least one logical unit for read off and control of the at least one first and second valve and the at least one first and second pressure instrument for pressurization and depressurization, where the logical unit further is arranged to use the pressure measurements in the reference volume and the annulus free volume in the pipe prior to and after depressurization and the dimension of the reference volume for the calculation of the annulus free volume in the pipe.

4. Arrangement according to claim 1, where the arrangement further comprises:
    at least one gas container for gas feed for pressurization,
    a pressure regulator connected to the gas container for pressure regulation of the gas feed, and
    at least one third valve to open and close for pressurization of the annulus free volume in the pipe.

5. Arrangement according to claim 4, where the arrangement further comprises:
    a third pressure instrument connected to the gas container to measure the pressure in the gas container,
    at least one fourth pressure instrument connected to the pressure regulator to indicate regulator settings,
    where the third pressure instrument and the at least one forth pressure instrument are further connected to the logical unit (408) for control and read off.

6. Arrangement according to claim 3, where the arrangement comprises:
    at least one first pressure relief valve for regulation of gas from the gas container.

7. Arrangement according to claim 1, where the arrangement comprises:
    at least one second pressure relief valve for regulation of gas from the annulus free volume in the pipe to the at least one outlet.

8. Arrangement according to claim 4 where the gas feed is from the at least one gas container or an internal gas container.

9. A method for determination of an annulus free volume in a pipe, characterized by acts comprising:
    establishing a pressure difference between the annulus free volume in the pipe and a reference volume,
    performing a number of depressurizations from the annulus free volume in the pipe to the reference volume, where the number of depressurizations is one or more,
    measuring pressure in the reference volume prior to and after each of the number of depressurizations,
    measuring pressure in the annulus free volume in the pipe prior to and after the total number of depressurizations, and
    calculating the annulus free volume in the pipe based on the measured pressure in the annulus free volume in the pipe prior to and after the total number of depressurizations, the measured pressure in the reference volume prior to and after each of the number of depressurizations and a dimension of the reference volume.

10. Method according to claim 9, further comprising:
establishing a predefined pressure in the reference volume prior to each of the number of depressurizations, and measuring pressure in the reference volume after each of the number of depressurizations.

11. Method according to claim 9, wherein the establishing pressure difference comprises gas diffusion to the annulus free volume in the pipe for pressurization.

12. Method according to claim 9, wherein the establishing pressure difference comprise gas feed from a gas container to the annulus free volume in the pipe for pressurization.

13. Method according to claim 9, wherein the establishing pressure difference comprises reduction of the pressure in the reference volume.

14. Method according to claim 9, further comprising:
after establishing of the pressure difference, determining whether the measured pressure in the annulus volume has reached a high pressure limit, followed by maintaining the pressure at the high pressure limit for a selected period of time, and
determining whether the measured pressure in the annulus volume after the selected period of time is within a predetermined accuracy level of the high pressure limit followed by further pressurization if the measured pressure is not within the predetermined accuracy of the high pressure limit, and further comprising depressurization from the annulus volume if the pressure is stabilized.

15. Method according to claim 9, further comprising:
after depressurization, determining whether the measured pressure in the annulus free volume in the pipe has reached a low pressure limit, and maintaining the pressure in the annulus free volume in the pipe for a selected period of time when the measured pressure in the annulus free volume in the pipe has reached the low pressure limit,
after the selected period of time, determining whether the measured pressure in the annulus free volume in the pipe is within a predetermined accuracy of the low pressure limit, followed by further depressurization of the annulus free volume in the pipe if the measured pressure in the annulus free volume in the pipe is not within the predetermined accuracy, and followed by calculation of the annulus free volume in the pipe if the pressure is stabilized.

16. Method according to claim 9, where the calculation of the annulus free volume is performed by use of the following equations:

$$V = \frac{V_{out}}{(P_{a1} - P_{a2})}$$

$$V_{at} = \sum_{i=1}^{i=n} V_{ref}(P_{ref1i} - P_{ref2i})$$

Where:
V is annulus free volume,
$V_{out}$ is accumulated volume during depressurization,
$V_{ref}$ is reference volume,
$P_{a1}$ is annulus pressure prior to the number of depressurizations (i=1)
$P_{a2}$ is annulus pressure after the number of depressurizations (i=n)
$P_{ref1}$ is pressure in the reference volume prior to depressurization number i to the outlet, $P_{ref2}$ is pressure in the reference volume after depressurization number i to the outlet, and
n is the number of depressurization cycles.

17. Method according to claim 9, wherein an accumulated volume calculation is performed by at least one logical unit based on data received from emptying the reference volume through at least one second valve at least one time until the low pressure limit in the annulus free volume of the pipe is reached.

18. Method according to claim 9, wherein establishing the pressure difference comprises pressurization and is performed by either (i) opening at least one first valve in pressure communication with the annulus free volume in the pipe and closing at least one second valve in pressure communication with the reference volume for use of diffused gas, or
(ii) adjusting a pressure regulator, opening of a third valve in pressure communication with a gas container and the annulus free volume in the pipe and closing the at least one second valve in pressure communication with the reference volume if the pressure difference is established using gas feed from the gas container.

19. Method according to claim 14, wherein the selected time period is zero for use of diffusion, or the pressure is maintained for a predetermined period of time until the pressure is stabilized if gas feed from a gas container is used.

20. Method according to claim 14, wherein when it is determined that the pressure is stabilized at a predefined high pressure limit, performing a pressure measurement by use of at least one second pressure instrument if diffused gas is utilized, or by closing a third valve and measuring pressure by use of at least one second pressure instrument if gas feed is utilized.

21. Method according to claim 14, wherein emptying of the reference volume is performed at least one time by closing at least one first valve in pressure communication with the annulus free volume in the pipe and opening at least one second in pressure communication with the reference volume until the low pressure limit in the annulus free volume in the pipe is reached.

22. Method according to claim 15, wherein when the pressure in the annulus free volume in the pipe is stabilized at the low pressure limit, performing pressure measurement by use of pressure instruments.

23. Method according to claim 19, comprising at least one of the following actions:
calculations corrected for diffusion,
calculations corrected for temperature differences, and
control of one or more components of the arrangement according to one of the claims 1-8.

24. Method according to claim 9, where the following actions are performed by a logical unit:
controlling at least one first valve for pressurization and depressurization of the annulus free volume in the pipe,
reading off at least one second pressure instrument for pressure measurement of the reference volume,
controlling at least one second valve for pressurization and depressurization of the reference volume, and
reading off at least one first pressure instrument for pressure measurement of the annulus volume in the pipe.

25. Method according to claim 9, wherein the following actions are performed by a logical unit:
reading at least one third pressure instrument for pressure measurement of at least one gas container,
controlling at least one pressure regulator for regulation of pressure of the gas feed from the gas container, reading at least one fourth pressure instrument to check the settings of the pressure regulator, and controlling at least one third valve for pressurization and depressurization of at least one gas container.

26. Method according to claim 9, further comprising at least one of the following actions:

comparing calculated annulus free volume in the pipe to one or more previously calculated annulus free volumes in the pipe for integrity evaluation, comparing accumulated volume per time to a normal condition, comparing accumulated volume per time to an historical trend, using calculated annulus free volume in the pipe for calculation of the pipe's remaining lifetime, saving and presenting measured and calculated values, and triggering one or more alarms if critical values are determined.

27. Method according to claim 9, wherein the method is performed continuously or at regular time intervals.

* * * * *